United States Patent [19]

Yano

[11] Patent Number: 4,470,154
[45] Date of Patent: Sep. 4, 1984

[54] OPTICAL COMMUNICATION NETWORK
[75] Inventor: Takashi Yano, Tokyo, Japan
[73] Assignee: Ricoh Company, Ltd., Japan
[21] Appl. No.: 331,678
[22] Filed: Dec. 17, 1981
[30] Foreign Application Priority Data Dec. 19, 1980 [JP] Japan ............................ 55-179981

[51] Int. Cl.³ .............................................. H04B 9/00
[52] U.S. Cl. ...................................... 455/607; 455/612
[58] Field of Search .............. 455/617, 607, 601, 610, 455/612; 370/4, 1; 350/96.16

[56] References Cited

U.S. PATENT DOCUMENTS

| | | | |
|---|---|---|---|
| 3,801,819 | 4/1974 | Ohnsorge | 455/601 |
| 4,017,149 | 4/1977 | Kao | 455/612 |
| 4,074,127 | 2/1978 | Mochida | 455/601 |
| 4,176,401 | 11/1979 | Lonberger | 455/601 |
| 4,225,753 | 9/1980 | Chown | 370/4 |
| 4,234,968 | 11/1980 | Singh | 350/96.16 |
| 4,335,463 | 6/1982 | Foucard | 455/612 |

OTHER PUBLICATIONS

*Proceedings: Intelcon 79 Conference*, Dallas, TX, Feb. 26–Mar. 2, 1979, pp. 150–155.

Primary Examiner—Howard W. Britton
Attorney, Agent, or Firm—Guy W. Shoup; Leighton K. Chong

[57] ABSTRACT

An optical communication network includes a plurality of nodes and optical fibers for interconnecting the nodes whereby an optical signal may be transmitted from a source node to a destination node which may be determined selectively. Each node includes input channels, output channels and a connection control device for controlling the connection between the input and output channels. Terminal devices are provided to be in operative association with selected nodes. Thus, the present invention provides a high speed network having high reliability. The present network is easy to expand and its reliability increases as it is expanded.

22 Claims, 19 Drawing Figures

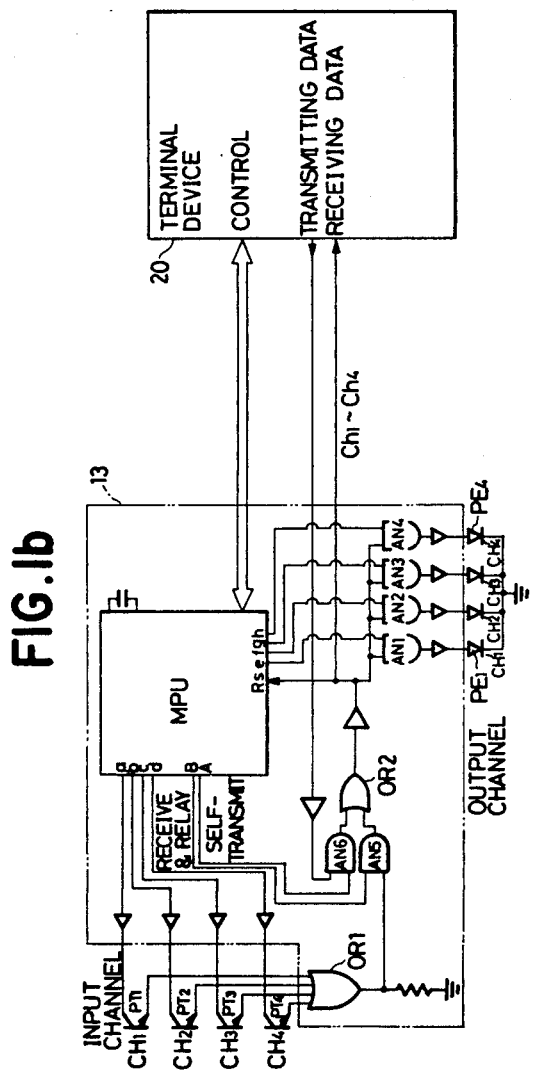

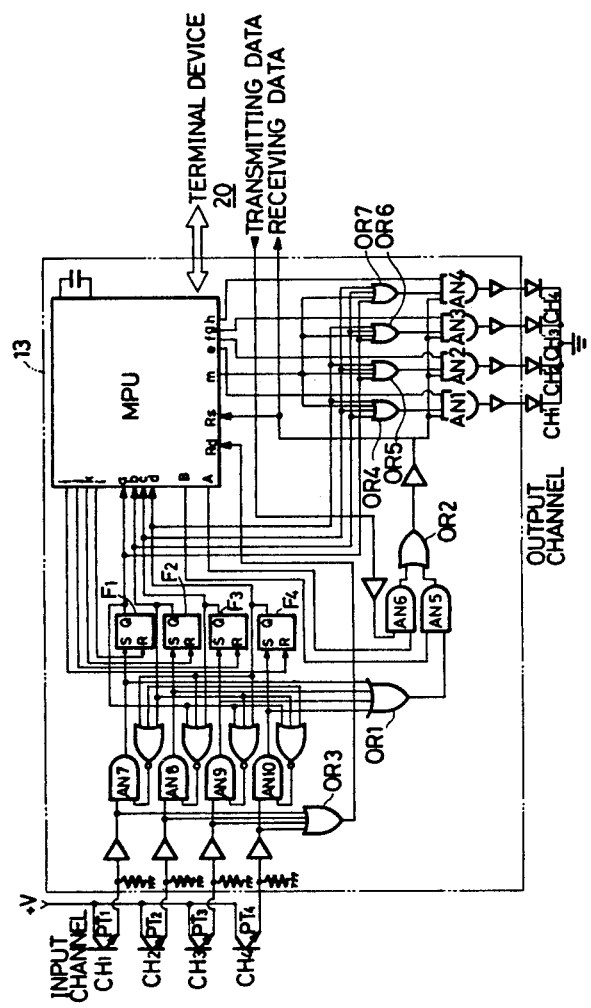

*INITIALIZE
For Fig.1b:
  A="0", B="1" and e~h="0"
For Fig.1c:
  F1~F4="RESET", A="0"
  B="1", e~h="1" and m="0"

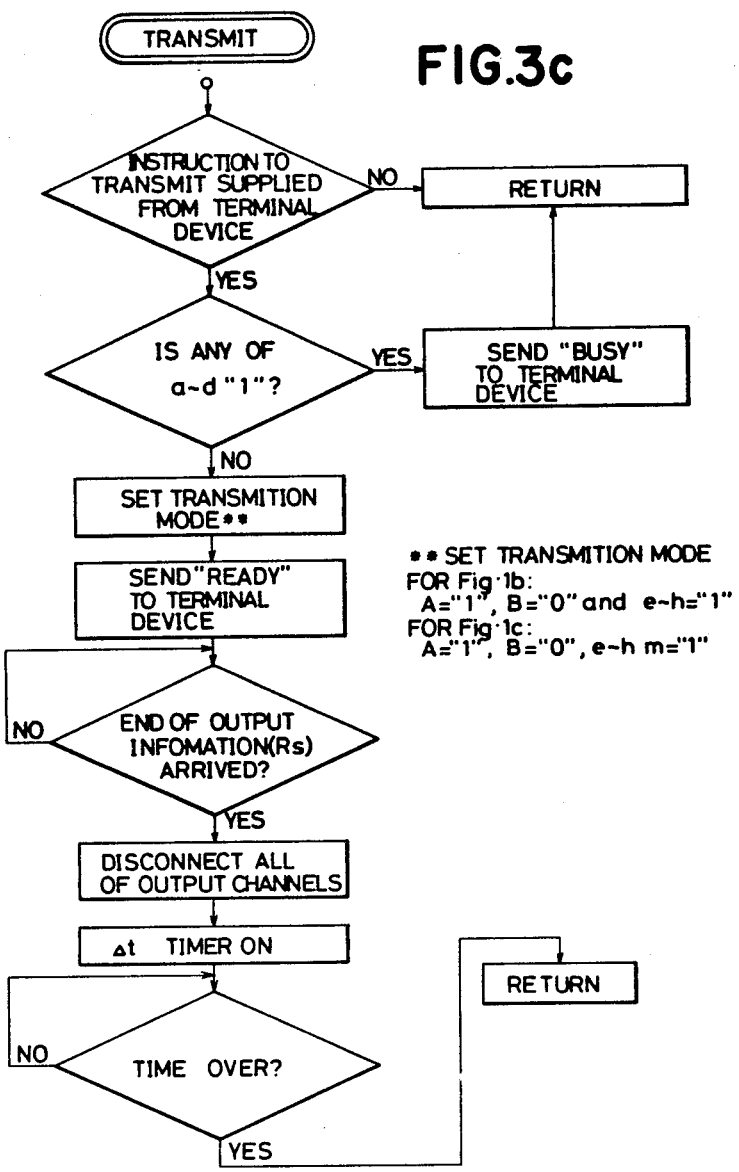

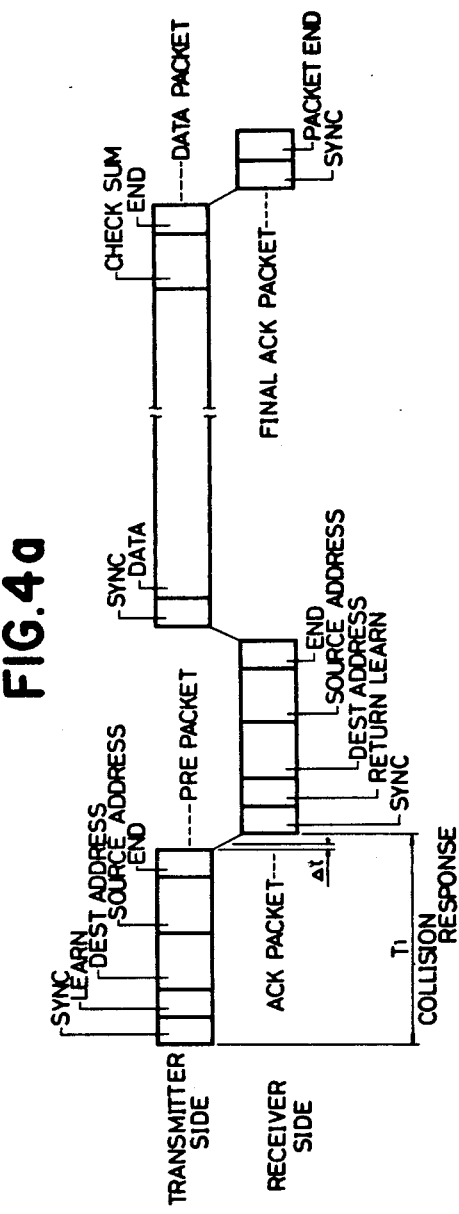

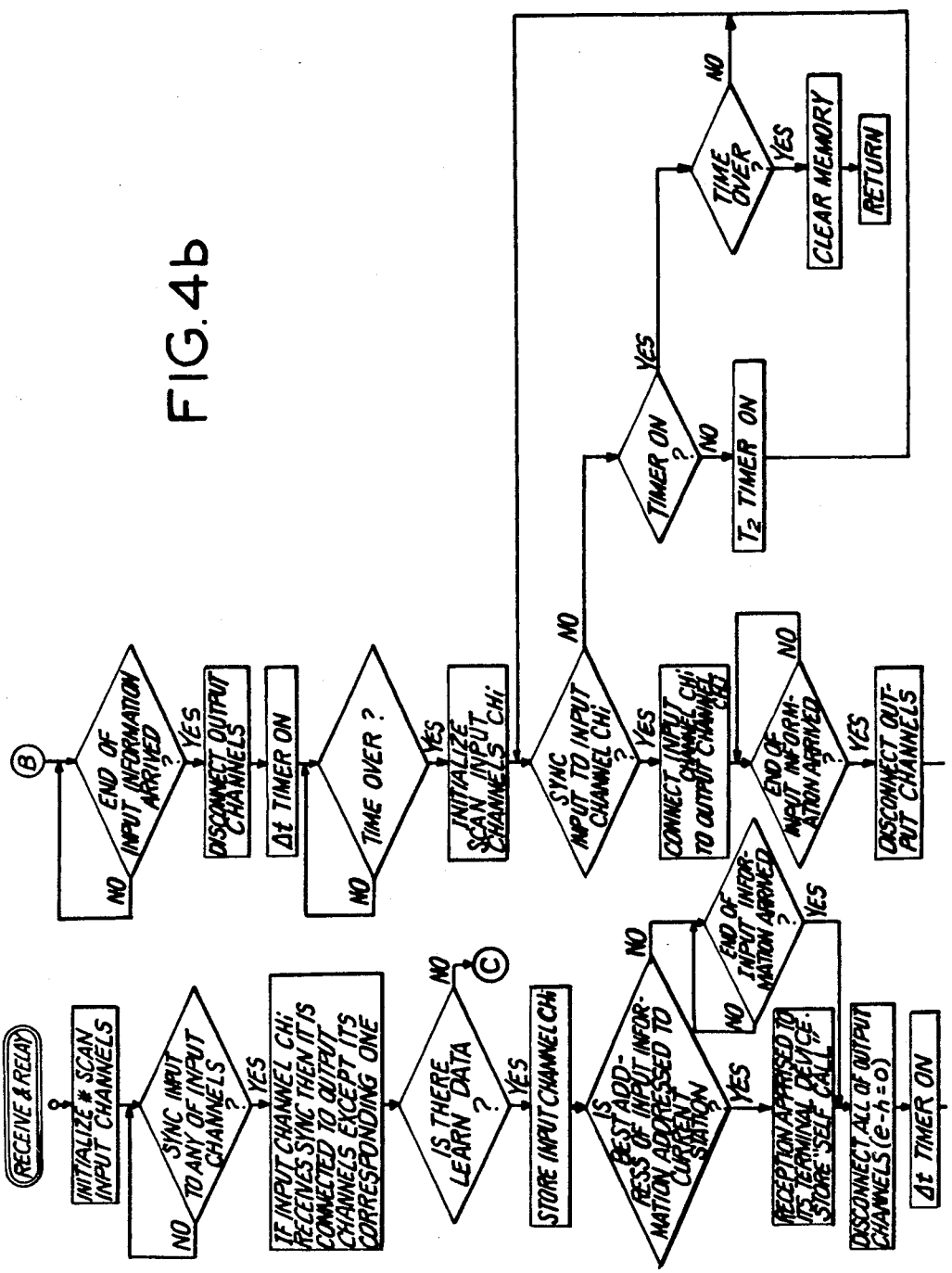

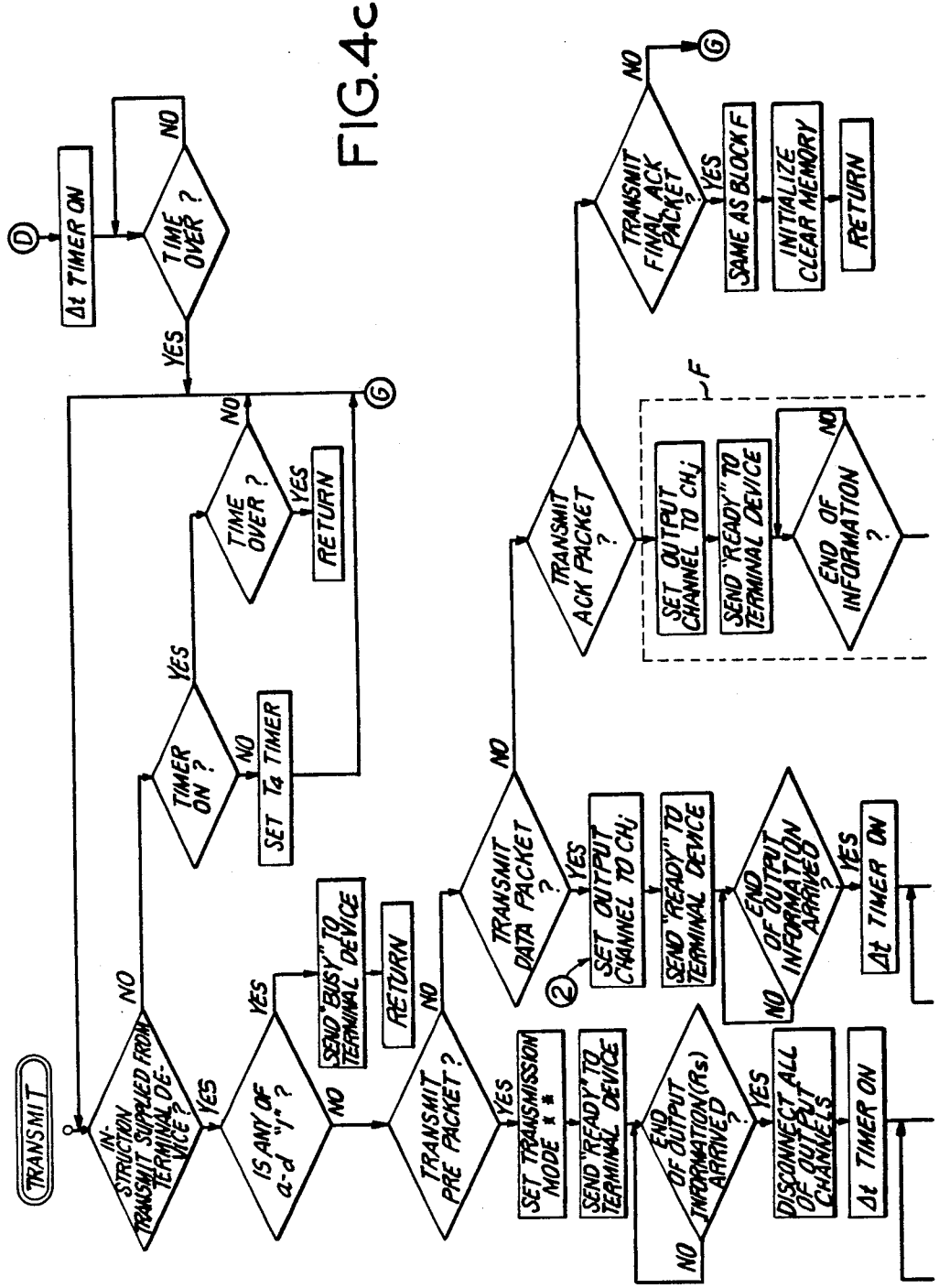

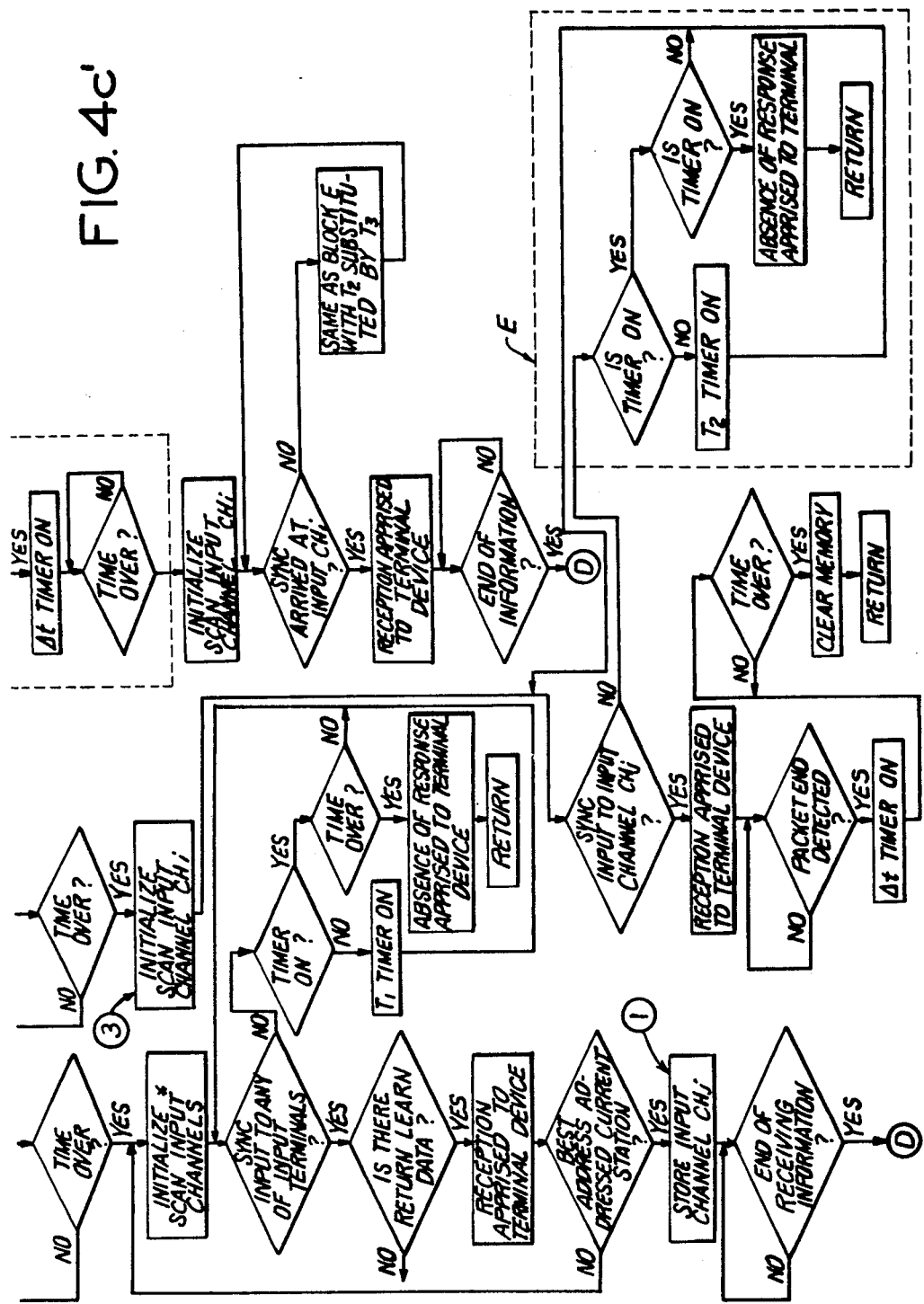

OPTICAL COMMUNICATION NETWORK

BACKGROUND OF THE INVENTION

1. Field of the Invention

This invention relates to optical communication networks and more in particular to an optical communication network which comprises a plurality of nodes and optical transmission lines for interconnecting the plurality of nodes thereby allowing to transmit an optical signal from a source node to a destination node or nodes.

2. Description of the Prior Art

Two different types of communication network system are well known in the art; they are a loop network system and a coaxial bus network system. Typically, the loop network system is described in "A Ring Network" by D. J. Farber, Datamation, Vol. 21, No. 2, Feb. 1975, 44-46 and the coaxial bus system is described in "Ethernet: Distributed packet switching for local networks" by R. M. Metcalfe and David R. Boggs, CACM, Vol. 19, No. 7, July 1976, 395-404.

For high speed applications of these network systems, an attempt has been and is being made to use optical fibers as interconnections between the nodes, but none has yet been successful from various reasons. For example, it is true that the loop network system has a capability of high speed transmission and a noise-resistant characteristic; however, since all of the nodes are connected in series by interconnecting transmission lines, there is a grave problem in reliability. That is, if a node or an interconnecting line fails, the whole system becomes inoperative. Moreover, once the network is completed, a further network expansion is difficult to make.

On the other hand, the bus coaxial network system is adaptive for expansion and is highly reliable, but it suffers from disadvantages such as difficulty in implementing high speed transmission and high susceptibility to noises. It is well recognized that an application of optical fibers to the Ethernet system is hindered mainly by technological difficulty because of the absence of a high impedance optical fiber "T" connector.

SUMMARY OF THE INVENTION

The disadvantages of the prior art are overcome with the present invention which provides an optical communication network of high quality.

In accordance with the present invention, an optical communication network comprises a first plurality of nodes, each including input means, output means and connection control means for controlling the connection between said input and output means; optical information transmission means for interconnecting the output means of each node of said first plurality nodes to the input means of at least another node; and terminal means operatively associated to selected ones of said first plurality of nodes.

Preferably, the input means of at least one node of said first plurality of nodes includes a second plurality of input channels, and the output means thereof includes a third plurality of output channels whereby said connection control means selectively connect said second plurality of input channels to said third plurality of output channels. Furthermore, the optical information transmission means, preferably, includes optical fibers, and each of the input channels is comprised of a first end portion of one of the optical fibers and a light receiving element spaced apart from said first end portion; whereas, each of the output channels is comprised of a second end portion of another of the optical fibers and a light emitting element spaced apart from said second end portion. Each of the light receiving elements is, preferably, comprised of a photodiode or phototransistor and each of the light emitting elements is, preferably, comprised of a light emitting diode.

The connection control means of each node, preferably, includes a controller which is electrically connected to the light receiving element of each of the input channels and to the light emitting element of each of the output channels. Preferably, the controller includes a microprocessor. It is preferable that the light receiving elements of the input channels are electrically connected to the light emitting elements of the output channels through gate means.

Preferably, the second plurality is equal to the third plurality. Preferably, the input means of at least one node of said first plurality of nodes includes a fourth plurality, different from said second plurality, of input channels and the output means thereof includes a fifth plurality, different from said third plurality, of output channels whereby the connection control means selectively connect the fourth plurality of input channels to the fifth plurality of output channels. It is also preferable that the fourth plurality is equal to the fifth plurality.

It is therefore an object of the present invention to provide an optical communication network of high quality.

Another object of the present invention is to provide an optical communication network highly adapted to expansion.

A further object of the present invention is to provide an optical communication network which is highly reliable.

A still further object of the present invention is to provide an optical communication network which increases its reliability as it is expanded.

A still further object of the present invention is to provide an optical communication network capable of transmitting the same optical signal from a single source node to a plurality of destination nodes at the same time.

A still further object of the present invention is to provide an optical communication network capable of carrying out separate communications between different source and destination nodes at the same time.

Other objects, advantages and novel features of the present invention will become apparent from the following detailed description of the invention when considered in conjunction with the accompanying drawings.

BRIEF DESCRIPTION OF THE DRAWINGS

FIG. 1b is a logic diagram showing one example of the connection control device 13 employed in the node 10;

FIG. 1c is a logic diagram showing another example of the connection control device 13;

FIG. 3c is a flow chart showing the sequence of the transmission operation of the present network;

FIG. 4a schematically illustrates the structure of another set of data packets which may be used in the present network;

FIGS. 4c and 4c' are a flow chart showing the sequence of the transmitting operation of the present network when the set of data packets shown in FIG. 3e are used;

DESCRIPTION OF THE PREFERRED EMBODIMENTS

Figure 1A:
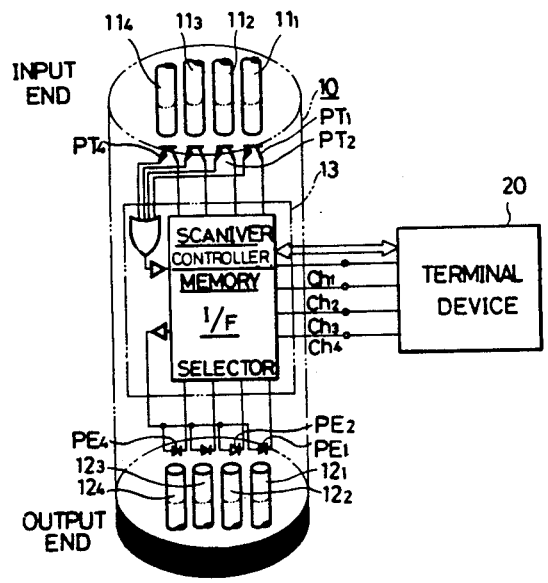
FIG. 1a is a schematic illustration showing one example of the node 10 to be used in the present optical communication network.

Referring now to FIG. 1a, there is shown the skeleton structure of a node 10 to be used in the optical communication network in accordance with the present invention. As shown, end portions of four optical fibers $11_1$ through $11_4$ are inserted into the node 10 at its input side. The node 10 includes four phototransistors $PT_1$ through $PT_4$ which are spaced apart in opposed relation from the end surfaces of the optical fibers $11_1$ through $11_4$, respectively so that an array of phototransistors $PT_1$ through $PT_4$ may detect a particular optical fiber through which an optical signal has been transmitted.

End portions of four optical fibers $12_1$ through $12_4$ are inserted into the node 10 at its output side. The node 10 includes four LED's $PE_1$ through $PE_4$ which are disposed at the location to direct emitted light to the end surfaces of the optical fibers $12_1$ through $12_4$, respectively. The node 10 further includes a connection control device 13 which is electrically connected to the phototransistors $PT_1$ through $PT_4$ and to the LED's $PE_1$ through $PE_4$, thereby the device 13 controls connections between the phototransistors $PT_1$ through $PT_4$ and the LED's $PE_1$ through $PE_4$, or between the optical fibers $11_1$ through $11_4$ and the optical fibers $12_1$ through $12_4$.

As may have already been understood, the end portions of the optical fibers $11_1$ through $11_4$ and the corresponding phototransistors $PT_1$ through $PT_4$ form four photo-couplers and thus input channels $CH_1$ through $CH_4$. Similarly, combinations of the end portions of the optical fibers $12_1$ through $12_4$ and the correspnding LED's $PE_1$ through $PE_4$ form four output channels $CH_1'$ through $CH_4'$, which are, in fact, photo-couplers.

One embodiment of the connection control device 13 is shown in FIG. 1b. As shown, the connection control device 13 includes a microprocessor unit MPU which has terminals a through d electrically connected to the collectors of the photodiodes $PT_1$ through $PT_4$, respectively, through an amplifier. The phototransistors $PT_1$ through $PT_4$ have their emitters connected to inputs of an OR gate OR1, the output of which is connected to ground via a resistor and also to one input of an AND gate AN5. The remaining input of the AND gate AN5 is connected from a terminal B of the microprocessor MPU.

The microprocessor MPU has another terminal A which is connected to one input of an AND gate AN6, the other input of which is connected to a terminal device 20. The outputs of the AND gates AN5 and AN6 are connected to inputs of an OR gate OR2, which has its output connected to one input of each of four AND gates AN1 through AN4 as well as to terminal Rs of the microprocessor MPU. The other inputs of these AND gates are connected to terminals e through h of the microprocessor MPU. The outputs of the AND gates AN1 through AN4 are connected to ground through respective LED's $PE_1$ through $PE_4$. A bus is provided to operatively associate the terminal device 20 to the microprocessor MPU.

In operation, when the terminals A and B are both "0" to set the AND gates AN5 and AN6 open, the input channels $CH_1$ through $CH_4$ are sequentially scanned in a predetermined order in repetition. During this scanning operation, an output from the OR gate OR1 is continuously observed, and when its output has become a high level or "1", the input channel $CH_i$ (i=one of 1 through 4 in this embodiment), which causes a high level output to be supplied from the OR gate OR1, is latched to be ready for reading and the scanning of the input channels $CH_1$ through $CH_4$ is discontinued. Then, in accordance with a control program stored in the one-chip microprocessor MPU, the AND gate AN5 and the AND gates AN1 through AN4 except ANi which corresponds to $CH_i$ are set to closed condition, i.e. terminal B="1" and terminals e through h="1." In this manner, the presence of input information to the node 10 is detected and the condition is established for supplying output information from the node 10.

The destination address, or DEST ADDRESS, of the received input information is interpreted, and if it is found to be directed to the current station, i.e., node 10 or its associated terminal device 20, the AND gates AN5 and AN1 through AN4 are set open with the terminal B="0" and the terminals e through h="0." In this manner, a signal is supplied to the terminal device 20 to establish an operative connection between the node 10 and the device 20 with inhibiting issuance of output signals from the node 10. And, when a transmission instruction is supplied from the terminal device 20, the AND gate AN5 is turned off with terminal B="0" and the AND gates AN6 and AN1 through AN4 are all turned on with terminals A and e through h all equal to "1." In this manner, the condition for transmission mode is established.

As will be described later, addition and modification may be made to the control program stored in the microprocessor MPU. The AND gate AN5 may be omitted by setting terminals a through d="0" instead of setting terminal B="0." Moreover, the AND gate AN6 may also be omitted by structuring the terminal device 20 to possess an ability to detect the "BUSY" state of the network. It should be noted that any other modifications may be entered to the embodiment shown in FIG. 1b by those skilled in the art.

FIG. 1c shows another embodiment of the connection control device 13 to be used in the present optical communication network. This embodiment is structually similar to the previous embodiment shown in FIG. 1b. However, flipflops $F_1$ through $F_4$ and AND gates AN7 through AN10 are provided between the phototransistors $PT_1$ through $PT_4$ and the terminals a through d, respectively. The microprocessor MPU has additional terminals i through l which are connected to the reset terminals of the flipflops $F_1$ through $F_4$, respectively. As shown, the inputs of the OR gate OR1 are connected from the outputs of the AND gates AN7 through AN10, respectively, which are also connected to the respective set terminals of the flipflops $F_1$ through $F_4$.

It is to be noted that in the embodiment of FIG. 1c, there is provided an additional OR gate OR3 having its output connected to a terminal Rd and its inputs connected from respective inputs of the AND gates AN7 through AN10. Besides, there are provided additional OR gates OR4 through OR7 whose inputs are connected to terminals a through d except one input which is commonly connected to terminal m. The outputs of the OR gates OR4 through OR7 are connected to inputs of the AND gates AN1 through AN4, respectively.

As regards the operation of the embodiment shown in FIG. 1c, the terminals i through l are momentarily set to "1" to reset the flipflops $F_1$ through $F_4$. With the conditions of terminal A="0", terminal B="1" and terminals e through d="1", when an input signal is received by the input channel $CH_i$, where i is an integer between 1 and 4, the corresponding flipflop $F_i$ is set and the AND gates AN7 through AN10 except ANi ($7 \leq i \leq 10$), which supplied a set signal to the flipflop $F_i$, are turned off. At the same time, the AND gates AN1 through AN4 except ANl ($1 \leq l \leq 4$) are turned on through the OR gates OR4 through OR7. The above operation is automatically carried out without the help of the microprocessor MPU except its initialization step.

In spite of the presence of an input signal, i.e., the output of the OR gate OR3 being "1", if all of the flipflops $F_1$ through $F_4$ are reset, i.e., terminals a through d="0", or two or more of the flipflops $F_2$ through $F_4$ are set, i.e., two or more of terminals a through d being equal to "1", the flipflops $F_1$ through $F_4$ are sequentially reset until a condition has been established such that only one of the terminals a through d is "1." The above operation is implemented by the program stored in the microprocessor MPU. It is to be noted that the microprocessor MPU may store the program to carry out the operations similar to those described previously in relation to the embodiment of FIG. 1b. For example, the microprocessor MPU may contain a program to selectively turn on or off the AND gates AN1 through AN4.

In the above-described two examples of the node 10, there are provided four input $CH_1$ through $CH_4$ and output $CH_1'$ through $CH_4'$ channels. It is to be noted, however, that the number of input or output channels should not be limited to four, and any appropriate number may be used. It is also true that a single input channel-single output channel system is not advantageous in the present invention so that at least either of the input or output side should include a plurality of channels.

It should further be noted that a part or all of the connection control device 13 may be incorporated into the terminal device. For example, the connection control device 13 may be structured to contain only a scanner, a controller and a selector with a memory and a interface circuit (I/F) transferred to the terminal device. Moreover, for those nodes which do not have a terminal device 20, the connection control device 13 may be so structured that it does not have a function to operate as a source or destination node; on the other hand, the device 13 may be so structured to send a reply signal indicating the absence of a terminal device back to the source node.

It will be easily appreciated that the phototransistors $PT_1$ through $PT_4$ may be substituted by other light receiving elements; whereas, use may be made of other light emitting elements in place of the LED's $PE_1$ through $PE_4$. Moreover, instead of using phototransistors and LED's, use may be made of other optical control means capable of switching, deflecting or splitting of light without 2 step conversion of light-to-electric current and electric current-to-light, such as often used in switching, deflecting or modulating a laser beam. Furthermore, instead of electrically scanning the photodiodes $PT_1$ through $PT_4$ to determine which input channel has first received an optical signal, use may be made of optical switching means to optically scan the output ends of the optical fibers $11_1$ through $11_4$. In this case, a single light receiving element is required to receive an optical signal from one of the optical fibers through the optical switching means.

Description will now be made of several embodiments of the present optical communication network with the use of the nodes as described above.

Figure 2A:
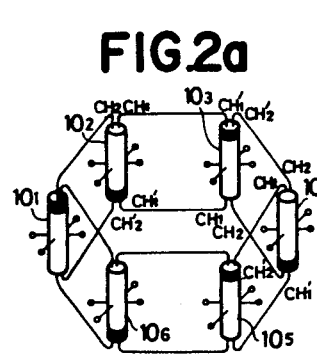
FIGS. 2a, 2b and 2c are schematic illustrations showing several network structures in accordance with the present invention.
Figure 2B:
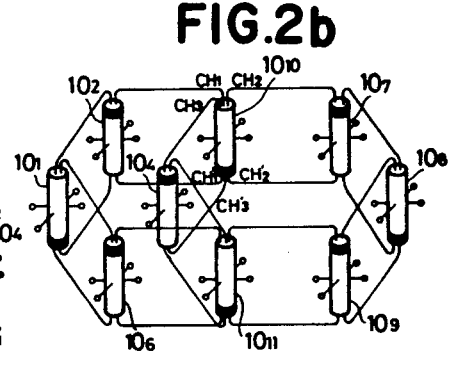
Figure 2C:
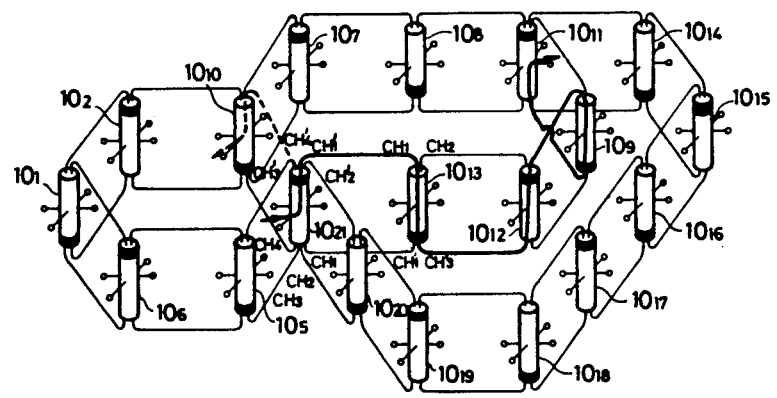

In the case of an optical communication network in the form of a loop, as shown in FIG. 2a, a ring network is formed by six 2-channel nodes $10_1$ through $10_6$. As shown in FIG. 2b, the ring network may be easily expanded with the use of a pair of 3-channel nodes $10_{10}$ and $10_{11}$; as shown in FIG. 2c, the ring network may further be expanded with the additional use of a 4-channel node $10_{21}$. It should thus be understood that the present network may have a linear structure, a hierarchy structure, a combination thereof, etc. The architecture of the present network is not limited to any of the above alternatives, but it may take any form as desired. Incidentally, in the drawings, a black-belted side of a node indicates an output side; whereas, its opposite side is an input side.

EXAMPLE 1

Use is made of a network having an architecture as shown in FIGS. 2a through 2c, and in the receiving mode, the connection control device 13 of each node scans its input channels. And, when an optical signal is supplied to the input channel $CH_i$, it is set as a receiving channel and is connected to all of the output channels except the corresponding output channel $CH_i'$ thereby the input signal is interpreted with the output channel $CH_i'$ disconnected. If the input signal has an address which coincides with that of the current node or its associated terminal device, then all of the output channels are disconnected and this state of address coincidence is apprised to the terminal device 20.

On the other hand, if there is a lack of address coincidence, the current status is maintained until the END of the input signal is reached. Then, when a predetermined time period $\Delta t$ has elapsed after the END of the input signal, all of the output channels are disconnected and then the condition of input channel scanning is re-established. In the case of apprising the presence of address coincidence to the terminal device 20, all of the output channels are also kept disconnected until the END of the input signal is reached, and the condition of input channel scanning is restored after a predetermined time period Δt has elapsed from the END of the input signal.

When the terminal device 20 supplies a transmission mode instruction to its associated node, the node sends "BUSY" back to the terminal device 20 if the terminals a and b="1", i.e., in the mode of receiving or relaying as shown in FIGS. 1b and 1c, and a wait condition holds until a=b="0" is obtained. When the terminals a and b become "0", the node sends "TRANSMISSION READY" to the terminal device 20 with terminal A="1", i.e., AND gate AN6 on, terminal B="0", i.e., AND gate AN5 off, terminals e through h="1", i.e., AND gates AN1 through AN4 on and terminal m="1." When a predetermined time period Δt has elapsed after the END of transmitting an output signal, the condition of input channel scanning is restored with terminal A="0", terminal B="1" and terminals e through h="0" for the embodiment shown in FIG. 1b, or with flipflops $F_1$ through $F_3$ reset, terminal A="0", terminal B="1", terminals e through h="1" and terminal m="0."

Figures 3A, 3B:
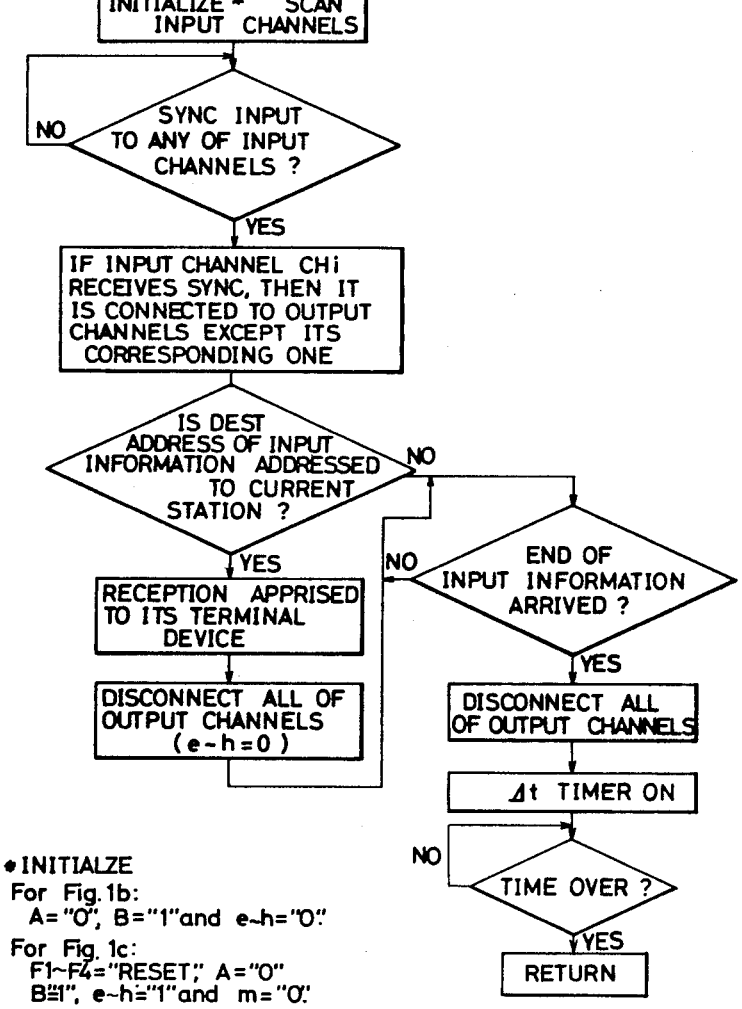
FIG. 3a schematically illustrates the structure of a data packet which may be used in the present network.
FIG. 3b is a flow chart showing the sequence of the receiving and relaying operation of the connection control device 13 in accordance with the present invention.

FIG. 3a shows the structure of a data packet to be used in this embodiment of the present invention. FIGS. 3b and 3c show the sequence of operation of the connection control device 13 at the time of receiving and relaying mode and at the time of transmitting mode, respectively. As shown in FIG. 3a, the data packet to be used in the present embodiment includes a synchronizing section "SYNC", destination address section "DEST ADDRESS", a source address code "SOURCE ADDRESS", a data section "DATA", an error detecting section "CHECK SUM" and an end signal section "END."

Figure 3D:
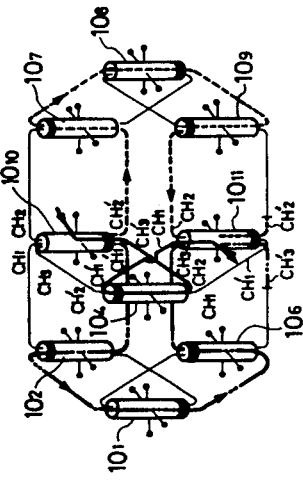
FIG. 3d is a schematic illustration showing the flow of a data packet from node 10 to node $10_{11}$.

Suppose that, in the network structure as shown in FIG. 3d, "SOURCE ADDRESS" is node $10_{10}$ or its associated terminal device and "DEST ADDRESS" is node $10_{11}$ or its associated terminal device and that the data packet of FIG. 3a is to be transmitted from node $10_{10}$ to node $10_{11}$. In the first place, the node $10_{10}$ supplies the data packet to all of its output channels $CH_1'$ through $CH_3'$. The node $10_4$ receives "SYNC" by its input channel $CH_2$ thereby connecting the input channel $CH_2$ to the output channel $CH_1'$. Since "DEST ADDRESS" of this data packet mismatches with the address of the node $10_4$, the output channel $CH_1'$ of the node $10_4$ is not shut off. Nodes $10_2$ through $10_9$ function similarly with the node $10_4$. Thus, the same data packet is supplied to all of the input channels $CH_1$ through $CH_3$ of the node $10_{11}$ via a first route $10_{10}$-$10_4$-$10_{11}$ (fat solid line), a second route $10_{10}$-$10_2$-$10_1$-$10_6$-$10_{11}$ (fat two-dotted line) and a third route $10_{10}$-$10_7$-$10_8$-$10_9$-$10_{11}$ (fat dotted line).

However, since the input channel $CH_1$ of the node $10_{11}$ receives "SYNC" in the first place, the node $10_{11}$ causes the input channel $CH_1$ to be connected to the output channels $CH_2'$ and $CH_3'$. As a result, the same data packet is supplied to the nodes $10_6$ and $10_9$; however, since the nodes $10_6$ and $10_9$, at this time, have their input channels connected to their output channels, respectively, they do not receive the in coming data packets, and the data packets which try to circulate at the nodes $10_6$ and $10_9$ are rejected.

When the node $10_{11}$ interprets the "DEST ADDRESS" of the data packet as matching with its own address, the output channels $CH_1'$ through $CH_3'$ of the node $10_{11}$ are shut off to apprise its associated terminal device of the fact of receiving the data addressed thereto. In this manner, the terminal device of the node $10_{11}$ receives only the data packet transmitted through the route $10_{10}$-$10_4$-$10_{11}$. All of the nodes $10_1$ through $10_{11}$, which received "SYNC" of the data packet, shut off their output channels upon detecting "END" of the data packet, and after time Δt has elapsed, the condition of input channel scanning is restored.

The reason why time Δt is provided after detection of "END" is that if the node $10_{11}$ were to return to the mode of input channel scanning right after detection of "END" of the data packet which travels along the route $10_{10}$-$10_4$-$10_{11}$, the light information of the tail end portion of the same data packet which travels along the longer route $10_{10}$-$10_2$-$10_1$-$10_6$-$10_{11}$ or $10_{10}$-$10_7$-$10_8$-$10_9$-$10_{11}$ would be detected to connect input and output channels. In order to avoid such false operation, time Δt is determined such that it is larger than the delay time of the network.

In the present embodiment, since the data packet is of the structure as shown in FIG. 3a, the transmission of the data packet is a one-way process and no confirmation of data packet reception is made. Thus, if it is desired to carry out confirmation of data packet reception, the data packet may be so structured to contain therein response request information, or an arrangement may be made previously between terminal devices such that upon receipt of a data packet addressed as its destination node, the receiving node automatically sends a return data packet which includes information indicating safe receipt of the transmitted data packet to the source node.

Figure 3E:
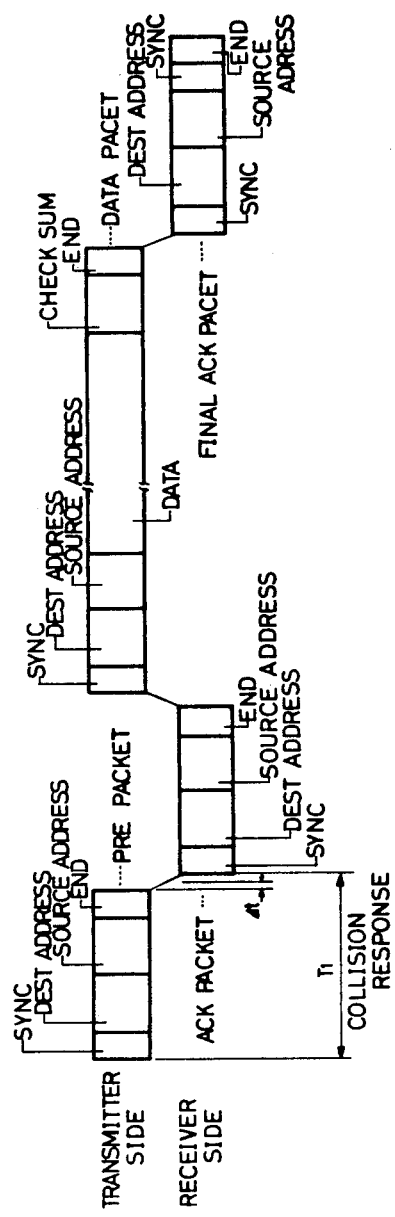
FIG. 3e schematically illustrates the structure of a set of data packets which may be used in the present network.

In the case of transmitting main data upon confirming the network and terminal conditions, the data packet of FIG. 3a may be utilized for the sequential operation of call, call-back, data transmission and acknowledgment of data transmission. On the other hand, use may be made of a set of data packets, as shown in FIG. 3e. In the structure shown in FIG. 3e, the transmitter side first sends out the "PRE PACKET", and when the transmitter side receives the "ACK PACKET" in response to the "PRE PACKET", the network recognizes the presence of a communicatable state. Then the transmitter side supplies "DATA PACKET" and a communication is completed when the transmitter side receives "FINAL ACK PACKET." It is to be noted that "DATA ADDRESS" and "SOURCE ADDRESS" may be omitted from the "DATA PACKET."

EXAMPLE 2

In this embodiment, at least the "PRE PACKET" and "ACK PACKET" are structured to be identifiable by themselves. When the connection control device 13 finds it to be a transmitting station by the identification of the data packet, it sends "PRE PACKET" to all of the output channels and upon receipt of the "ACK PACKET" in response to the "PRE PACKET" the output channel $CH_j'$ is stored and the "DATA PACKET" is transmitted only to the output channel $CH_j'$. If the connection control device 13 is not a transmitting station, the input channel $CH_i$ is stored upon arrival of the "PRE PACKET." In turn, when the "ACK PACKET" is received, its input channel $CH_j$ is stored. After "END" of "ACK PACKET", the input channel $CH_i$ is connected to output channel $CH_j'$. And, when the "END" of the "DATA PACKET" is detected, the input channel $CH_j$ is connected to the output channel $CH_i'$. Then upon detection of the "PACKET END" of the "FINAL ACK PACKET", the information thus stored is cleared and the input channel scanning condition is restored.

Figure 4B:
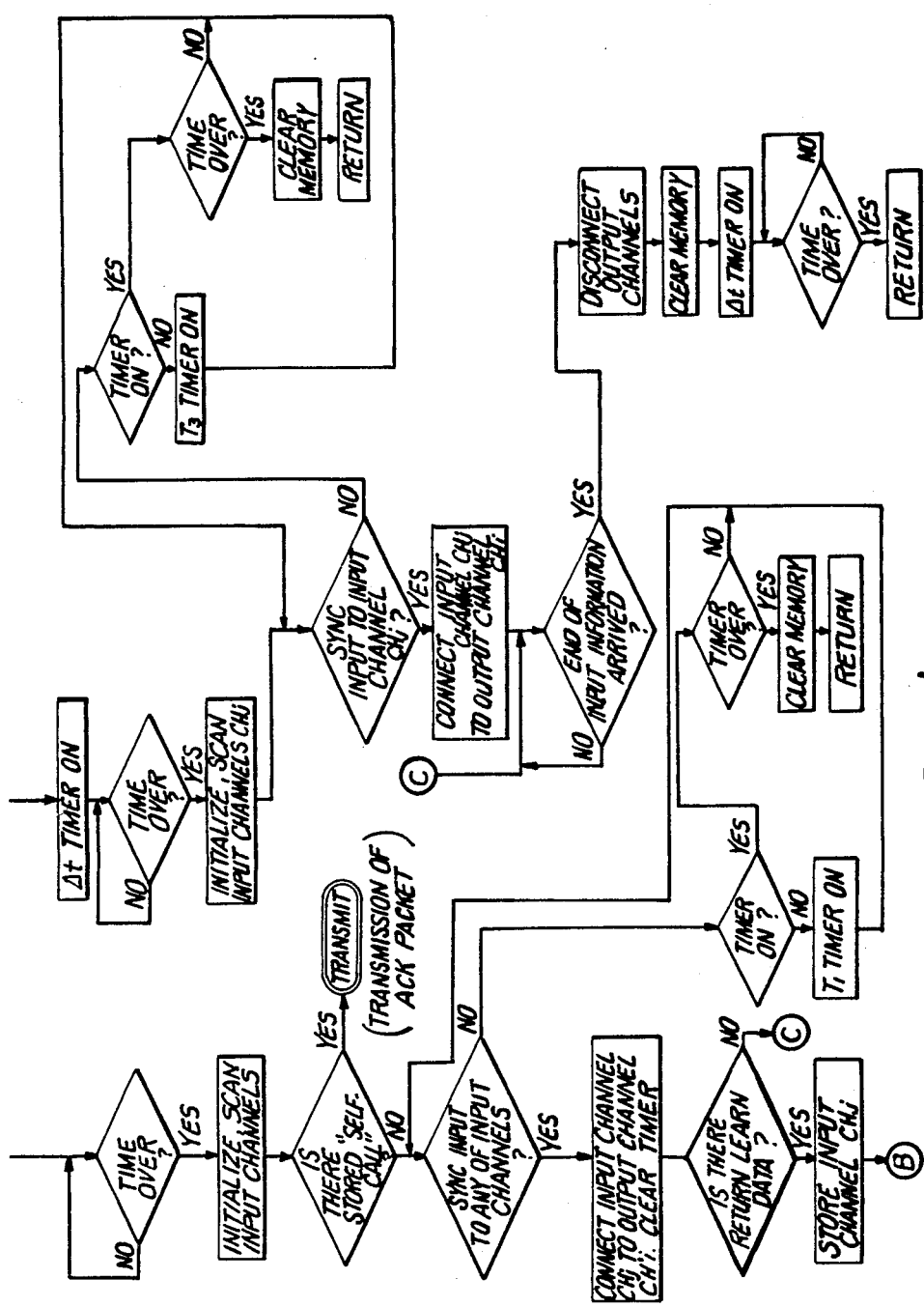
FIGS. 4b and 4b' are a flow chart showing the sequence of the receiving and relaying operation of the present network when the set of data packets shown in FIG. 3e are used.

FIG. 4a shows the strucure of a set of data packets in accordance with the embodiment of the present invention. And, FIGS. 4b and 4c show the sequence of operation of the receiving and relaying mode and the transmitting mode, respectively. As shown in FIG. 4a, in this embodiment, the "PRE PACKET" is identified by the "LEARN" data and the "ACK PACKET" is identified by the "RETURN LEARN" data. Moreover, the "PACKET END" is used to indicate the end of the "FINAL ACK PACKET", or a batch of communication.

Again, with reference to FIG. 3d, description will be had as to the transmitting and receiving operation of the node $10_{10}$, the receiving and transmitting operation of the node $10_{11}$ and the relaying operation of the remaining nodes assuming that a message is to be supplied from the node $10_{10}$ to the node $10_{11}$. The transmission of "PRE PACKET" is carried out in a manner similar to that of the above Example 1. However, in the present example, each of the nodes except the transmitting or source node $10_{10}$ will store the channel $CH_i$ which has first detected a light signal as different from the previous example.

In the case of the network shown in FIG. 3d, the receiving or destination node $10_{11}$ stores information of the input channel $CH_i$ (i=1) connected from the output side of the node $10_4$. Upon receiving "PRE PACKET", the node $10_{11}$ supplies "ACK PACKET" as a response. In this instance, the node $10_{11}$ supplies "ACK PACKET" only to the output channel $CH_i'$ (i=1). Each of the nodes which receive the "ACK PACKET" thus supplied stores information as to the input channel $CH_j$ (j=1 for the node $10_4$ and j=3 for the node $10_{10}$) and then the input channel $CH_j$ is connected to the output channel $CH_j'$. Explaining more in detail as to the node $10_4$, it stores information of its input channel $CH_2$ upon receipt of the "PRE PACKET" and then it stores information of its input channel $CH_1$ upon receipt of the "ACK PACKET" and then the channels $CH_2$ and $CH_1$ thus stored are connected to the output channels $CH_1'$ and $CH_2'$, respectively. It will thus be understood that "ACK PACKET" is supplied only to the node from which "PRE PACKET" has been transmitted. Thus, "ACK PACKET" is supplied only along the route $10_{11}$-$10_4$-$10_{10}$.

The nodes which have received "PRE PACKET" trigger their timers and each of them returns to a main routine by clearing the stored information as to the input channel $CH_i$ if each has not received "ACK PACKET" within a predetermined period of time. As a result, after a predetermined period of time has elapsed upon completion of transmitting "PRE PACKET", a communication route is established along $10_{10}$-$10_4$-$10_{11}$ by storing information as to appropriate input and output channels. The node $10_{10}$ does not accept a signal from any of the nodes $10_2$ and $10_7$, and it does not supply a signal to any of them. By the same token, the node $10_{11}$ does not accept a signal from any of the nodes $10_6$ and $10_9$ and it does not supply a signal to any of them.

Therefore, the route $10_7$-$10_8$-$10_9$ and the route $10_2$-$10_1$-$10_6$ are set in a free condition so that another communication, e.g., between the nodes $10_7$ and $10_9$ or the nodes $10_1$ and $10_6$, may be carried out. However, in the network of FIG. 3d, a communication along the route $10_2$-$10_7$ or $10_1$-$10_8$ can not be implemented. Thus, even if "PRE PACKET" is set out, "ACK PACKET" is not received so that no communication route is established across the nodes $10_{10}$ or $10_{11}$, which are currently in use.

Returning to a communication along the route $10_{10}$-$10_{11}$ thus established, when the source node $10_{10}$ receives "ACK PACKET", it stores information as to the input channel $CH_j$ (j=3) and supplies "DATA PACKET" to the output channel $CH_j'$ (j=3). The node $10_4$ is only scanning its input channel $CH_i$ (i=2) and when it receives "SYNC", the input channel $CH_i$ (i=2) is connected to the output channel $CH_j'$ (j=1). On the other hand, the node $10_{11}$ is only scanning the input channel $CH_i$ (i=1) and when it receives "SYNC", it apprises its terminal device of receiving of "SYNC."

Then the node $10_{11}$ sets the output channel $CH_i'$ (i=1) in a transmitting mode, and the nodes $10_4$ and $10_{10}$ only scan the input channel $CH_j$ (j=1 for the node $10_4$ and j=3 for the node $10_{10}$). Then the terminal device of the node $10_{11}$ supplies "FINAL ACK PACKET" and when the node $10_4$ reads its "SYNC" section, it causes its input channel $CH_j$ (j=1) to be connected to the output channel $CH_i'$ (i=2). Upon completion of communication of the "FINAL ACK PACKET", the nodes $10_{11}$, $10_4$ and $10_{10}$ clear the stored information as to the input and output channels $CH_i$, $CH_i'$, $CH_j$ and $CH_j'$ and returns to a main routine.

In this example, as described above, a single shortest route is selected and it is fixed until a set of communication shown in FIG. 4a is completed. It is to be noted that after transmission of "ACK PACKET" in response to "PRE PACKET", or even during transmission of "DATA PACKET" and "FINAL ACK PACKET", another communication or more may be carried out by using the remaining nodes. Thus, if "DATA PACKET" contains facsimile data, this selective route fixing method is particularly advantageous because the utilization rate of a network is remarkably improved. It is to be further noted that as the number of nodes increases, the number of neck nodes such as $10_{10}$ and $10_{11}$ decreases, and, therefore, the possibility to carry out different communications simultaneously by network dividing is enhanced.

EXAMPLE 3 (FIXED BROADCASTING)

Figures 5A, 5B, 5C:
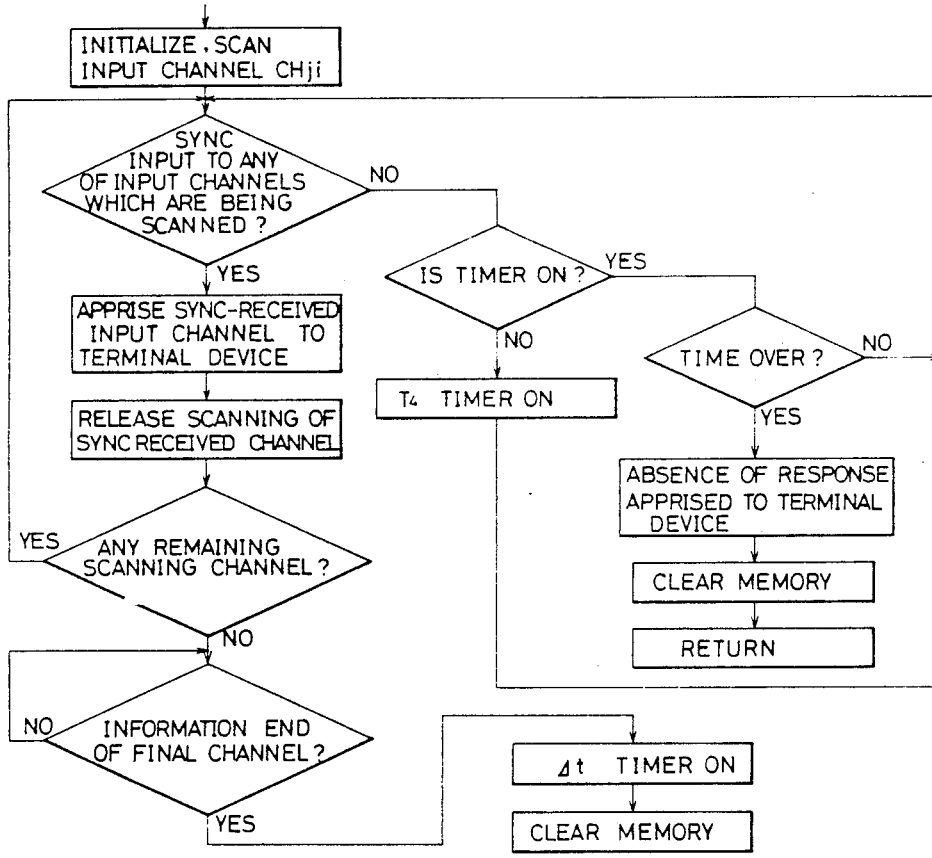
FIGS. 5(A), 5(B) and 5(c) show portions of the flow chart of FIG. 4c which are to be substituted when the set of data packets shown in FIG. 4a are used.
Figure 6:
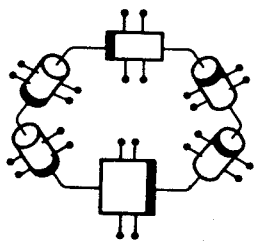
FIG. 6 is a schematic illustration showing the prior art optical loop network.
Figure 7:
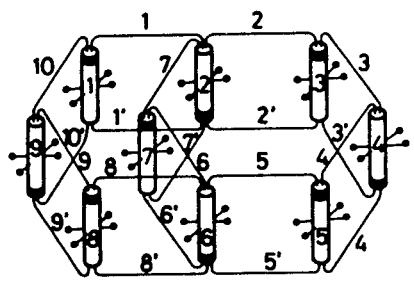
FIG. 7 is a schematic illustration showing one example of the present network.

As described above, in the network of example 2, a communication route between source and destination nodes is uniquely defined by exchange of "PRE PACKET" and "ACK PACKET", and, therefore, the terminal device of the source node can carry out the broadcasting technique, i.e., a message may be transmitted to desired one or more of the nodes at the same time. If the expected maximum number of destination nodes in carrying out broadcasting is m, then the number of input and/or output channels of a source node should be m or more, and the connection control device 13 of such a source node should be able to store m sets of information as to the input channels $CH_j$ which received "ACK PACKET." In this case, the connection control device 13 should store such information in the form of $CH_{jm}$, where the first suffix indicates a channel number and the second suffix indicates a node number and j and m are positive integer numbers. Thus, when the source node supplies "DATA PACKET", it is supplied to all of the output channels $CH_{jm}'$ and all of the input channels $CH_{jm}$ are scanned to detect the arrival of "FINAL ACK PACKET." The sequence of operation in this case is similar to what is shown in FIG. 4c, and, therefore, only those steps which differ from what is shown in FIG. 4c are shown in FIGS. 5(A) through (C).

Alternatively, it may be so structured that the terminal device of a source node stores information of selected input and output channels. In this case, the input and output channels are selectively rendered operative in accordance with information supplied from the terminal device. And every time when the node receives an input signal, its input channel number is sent to the terminal device. Thus, when an instruction to carry out broadcasting is received, only those input and output channels selected by the associated terminal device are rendered operative.

In either of the above two cases, the sequence of receiving and relaying operation may be identical with what is shown in FIG. 4b and thus a detailed description in this regard will be omitted here. The source node in carrying out the broadcasting technique should preferably include separate lines for interconnecting its associated terminal device to the outputs of its input channels.

MODIFICATION OF EXAMPLE 3 (SEMI-FIXED BROADCASTING)

In this case, "DATA PACKET" is modified to include a "FIX" section between the "SYNC" and "DATA" sections. The terminal device in this case sends "PRE PACKET" one by one for each of destination nodes in the broadcasting mode. The connection control device of each node is so structured to successively store information as to the input channel $CH_i$ every time when "PRE PACKET" is received and to successively store information as to the input channel $CH_j$ upon receipt of every "ACK PACKET." Then when the node receives "DATA PACKET" which includes "FIX", the input channel which has received it is connected to all of the output channels $CH_i'$, which correspond to the successively stored input channels $CH_i$; in turn, when "SYNC" is received, it is connected to all of the output channels $CH_j'$. Then, when "END" of "FINAL ACK PACKET" is detected, all of the stored information is erased. As understood, this case is a combination of Examples 1 and 3.

It is to be noted that each of the relay nodes erases its stored information if it does not receive "ACK PACKET" within a predetermined period of time from the "END" of "PRE PACKET" and that if the destination node receives an input signal at its input channel $CH_i$, then it sends out a reply packet through the corresponding output channel $CH_i'$ In accordance with the embodiment described in Example 3, a communication route is successively fixed for each of the destination nodes so that interrupting nodes may be produced before establishing all of the required routes. In this instance, a broadcasting system cannot be completed. On the other hand, in accordance with this modified version, the relay node only stores successively information as to input channels for transmission and reception, and no channel is specified in relaying "PRE PACKET" and "ACK PACKET." Therefore, no interrupting node is produced and the communication of "PRE PACKET" and "ACK PACKET" may be carried out between the source node and all of the destination nodes without any problem.

In relaying "DATA PACKET", the relay node sends out "DATA PACKET" to all of its output channels through which "PRE PACKET" has been sent out, and, thus, "DATA PACKET" may be received by all of the destination nodes. The same holds true for "FINAL ACK PACKET".

During the time when "PRE PACKET" and "ACK PACKET", which are both relatively short in length, are being communicated, all of the nodes are rendered communicatable with any other nodes and separate communication routes are not formed. However, during the time when "DATA PACKET" and "FINAL ACK PACKET" are being communicated, only those channels specified by each node to form a communication route are rendered operative, and, thus, another route may be formed by the remaining nodes or channels to carry out a separate communication. This feature is particularly advantageous for the communication with long data because it enhances the utilization rate of the whole network.

If broadcasting is to be carried out in the network of FIG. 2c with the node $10_{21}$ as a source node and the nodes $10_{10}$ and $10_{11}$ as destination nodes, the same "DATA PACKET" is transmitted along the routes indicated by the fat solid line and the fat dotted line. Under the condition, separate communications may be carried out along a part or the whole of the route $10_7$-$10_8$, $10_{14}$-$10_{15}$—$10_{20}$, or $10_2$-$10_1$-$10_6$-$10_5$.

If the node $10_8$ is another destination node, since the node $10_{10}$ stores information as to its input channels during the time of relaying "PRE PACKET" to the node $10_8$ and the time of relaying "ACK PACKET" from the node $10_8$ to the node $10_{21}$, the node $10_{10}$, upon receiving "DATA PACKET", transmits the "DATA PACKET" to its associated terminal device and also to the node $10_7$, which, in turn, relays it to the node $10_8$. Therefore, the destination nodes $10_{10}$ and $10_{11}$ in this case do not constitute interrupting nodes for those nodes such as $10_7$ and $10_8$ in the broadcasting mode. Alternatively, the exchange of "PRE PACKET" and "ACK PACKET" may be repetitively carried out for a predetermined number of times for the same destination node, during which each node successively stores information as to its input channels $CH_i$ and $CH_j$, and, thereafter, "DATA PACKET" is supplied.

OTHER EXAMPLES AND MODIFICATIONS

In accordance with any of the above-described embodiments, in relaying a signal, each node causes the input channel $CH_i$, which have first received an input signal, to be connected to all of its output channels except the corresponding output channel $CH_i'$. It should however be noted that the input channel $CH_i$ may be connected to all of the output channels including the corresponding output channel $CH_1'$. In this case, since the source node only functions to supply an output signal with its input channels shut off and the relay nodes have already completed connections between the input and output channels, an output signal supplied from one of the nodes will not be returned to its node.

The feature of connection between the input node $CH_i$ and its corresponding node $CH_i'$ is particularly advantageous for checking the status of adjacent nodes or the communication characteristics with adjacent nodes. Even if one or more nodes fail, a communication may be carried out in the present invention. Thus, failure of a small number of nodes may not be easily detected. However, by supplying a particular output signal from the output channel $CH_i'$ and receiving it with the corresponding input channel $CH_i$ for comparison, the presence of abnormal condition may be easily detected. Accordingly, in the mode of connecting an input channel to all of the output channels, status check may be carried out during operation.

In the case of the node 10 shown in FIG. 1a, input and output channels are separately arranged in the form of a single array. However, input and output channels may be arranged side-by-side. Such a side-by-side arrangement is particularly useful when use is made of double core optical fibers. As described above, the architecture of the present network is not limited to a loop, as shown in FIGS. 2a through 2c, but it may take a linear or hierarchy structure, or any combination between linear, hierarchy and loop structures. It is to be noted that any other architecture than those described above may be applied to the present invention. It is also true that the architecture of the network constructed with a loop or star as a base can enjoy the highest reliability in operation. It should further be noted that a part or the whole of the control function of the connection control device may be incorporated into the terminal device. Conversely, at least a part of the function of the terminal device may be incorporated into the connection control device.

The following are the main advantages of the present invention.

(1) The network may be expanded freely just by addition of nodes. Because a central node such as a supervisor to control the whole network is absent and all of the nodes have an equal weight, a partial contraction is also feasible.

(2) The shortest possible route is selected under the current network condition and a data transmission is carried out through the thus selected route.

(3) A plurality of separate communications may be carried out by using different communication routes selectively defined in the network (Examples 2 and 3).

(4) Broadcasting can be carried out (Example 3).

(5) High reliability. In the prior art, as the size of the network becomes larger, its reliability goes down. On the other hand, in accordance with the present invention, its reliability is improved as the network becomes expanded.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An optical communication network comprising:
   a first plurality of nodes, each including input means, output means and connection control means for controlling the connection between said input and output means;
   optical information transmission means for interconnecting the output means of each node of said first plurality of nodes to the input means of at least another node; and
   a selected number of terminal means (operatively associated to selected ones) for sending and/or receiving a signal transmitted through said communication network, each of said terminal means being connected to the connection control means of an associated node of said first plurality of nodes.

2. The optical communication network of claim 1 wherein the input means of at least one node of said first plurality of nodes includes a second plurality of input channels, and the output means thereof includes a third plurality of output channels whereby in response to an input signal from a node received by one of said second plurality of input channels, said connection control means selectively connects said second plurality of input channels to said third plurality of output channels.

3. The optical communication network of claim 2 wherein said optical information transmission means includes optical fibers, and each of the input channels is comprised of a first end portion of one of said optical fibers and a light receiving element spaced apart from said first end portion; whereas, each of the output channels is comprised of a second end portion of another of said optical fibers and a light emitting element spaced apart from said second end portion.

4. The optical communication network of claim 3 wherein each of the light receiving elements is comprised of a photodiode or phototransistor and each of the light emitting elements is comprised of a light emitting diode.

5. The optical communication network of claim 3 wherein the connection control means of each of said nodes includes a controller which is electrically connected to the light receiving element of each of the input channels and to the light emitting element of each of the output channels.

6. The optical communication network of claim 5 wherein said controller includes a microprocessor.

7. The optical communication network of claim 5 wherein the light receiving elements of the output channels are electrically connected to the light emitting elements of the output channels through gate means.

8. The optical communication network of claim 2 wherein said second plurality is equal to said third plurality.

9. The optical communication network of claim 2 wherein the input means of at least one node of said first plurality of nodes includes a fourth plurality, different from said second plurality, of input channels and the output means thereof includes a fifth plurality, different from said third plurality, of output channels whereby said connection control means selectively connect said fourth plurality of input channels to said fifth plurality of output channels.

10. The optical communication network of claim 9 wherein said fourth plurality is equal to said fifth plurality.

11. The optical communication network of claim 8 wherein said one of said second plurality of input channels receiving said input signal is connected to all of said third plurality of output channels by said connection control means.

12. The optical communication network of claim 8 wherein said one of said second plurality of input channels receiving said input signal is connected to all of said third plurality of output channels except one output channel which is connected to a node which supplied said input signal to said one of said second plurality of input channels receiving said input signal by said connection control means.

13. The optical communication network of claim 8 wherein said one of said second plurality of input channels receiving said input signal is connected to a predetermined one of said third plurality of output channels by said connection control means.

14. The optical communication network of claim 13 wherein information as to said predetermined one of said third plurality of output channels is temporarily stored in said connection control means and said information is cleared if said input signal has not been received within a predetermined time period.

15. The optical communication network of claim 2 wherein said second plurality of input channels are scanned in a predetermined order repetitively by said communication control means, whereby said input channels are enabled when scanned.

16. The optical communication network of claim 15 wherein said scanning is halted for a predetermined time period when one of said second plurality of said input channels has received an input signal.

17. The optical communication network of claim 16 wherein said predetermined time period is long enough for the remaining input channels to reject reception of the same input signal transmitted through other routes.

18. The optical communication network of claim 8 wherein each of said input channels forms a pair with one of said output channels in each node, and paired input and output channels of one node are connected to paired output and input channels, respectively, of another node through said optical information transmission means.

19. The optical communication network of claim 18 wherein said optical information transmission means includes a pair of optical fibers one of which optically connects said paired input channel of one node to said paired output channel of another node and the other of which optically connects said paired output channel of one node to said paired input channel of another node.

20. The optical communication network of claim 19 wherein said connection control means of each node includes a memory for temporarily storing information as to a first input channel which has received a first signal, and when a second input channel has later received a second signal, said connection control means causes said second input channel to be connected to a first output channel paired with said first input channel.

21. The optical communication network of claim 20 wherein said first signal is issued from a first terminal means acting as a source station and said second signal is issued in response to said first signal from a second terminal means acting as a destination station.

22. The optical communication network of claim 20 wherein said memory also temporarily stores information as to said second input channel, and said connection control means controls such that a signal received by said first input channel is supplied to a second output channel paired with said second input channel and another signal received by said second input channel is supplied to said first output channel paired with said first input channel.

* * * * *